United States Patent
Sheu

(10) Patent No.: US 8,643,310 B2
(45) Date of Patent: Feb. 4, 2014

(54) DRIVING CIRCUIT AND OPTICAL CONNECTOR HAVING SAME

(75) Inventor: Yi-Zhong Sheu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 55 days.

(21) Appl. No.: 13/523,897

(22) Filed: Jun. 15, 2012

(65) Prior Publication Data
US 2013/0162174 A1   Jun. 27, 2013

(30) Foreign Application Priority Data
Dec. 27, 2011   (TW) .............................. 100148785 A

(51) Int. Cl.
*H05B 37/02* (2006.01)

(52) U.S. Cl.
USPC ............................ 315/307; 315/297; 315/308

(58) Field of Classification Search
USPC .......................... 315/291, 294, 297, 307, 308
See application file for complete search history.

(56) References Cited

U.S. PATENT DOCUMENTS

| | | | |
|---|---|---|---|
| 8,253,353 B2* | 8/2012 | Baggen et al. | 315/308 |
| 8,350,499 B2* | 1/2013 | Nelson | 315/307 |
| 2010/0327764 A1* | 12/2010 | Knapp | 315/250 |
| 2013/0076265 A1* | 3/2013 | Mills et al. | 315/297 |
| 2013/0249439 A1* | 9/2013 | Shteynberg et al. | 315/307 |

* cited by examiner

*Primary Examiner* — Tung X Le
(74) *Attorney, Agent, or Firm* — Altis Law Group, Inc.

(57) ABSTRACT

A driving circuit for driving a light source of an optical connector includes a controller, an equalizer, a pseudo-random binary sequence (PRBS) generator, and a driver. The controller controls the driving circuit such that the light source is driven to emit by the driver according to an input signal sending into the equalizer for transmitting the input signal or a PRBS test signal generated by the PRBS generator for test a bit error rate of the optical connector.

5 Claims, 2 Drawing Sheets

DRIVING CIRCUIT AND OPTICAL CONNECTOR HAVING SAME

BACKGROUND

1. Technical Field

The present disclosure relates optical connectors and, particularly, to a driving circuit and an optical connector employing the driving circuit, which can reduce cost and inconvenience of a bit error rate test.

2. Description of Related Art

An optical connector includes a light source and a driving circuit. The driving circuit drives the light source to emit light according to a binary sequence (i.e., data to be transmitted), that is, the driving circuit modulates the light emitted by the light source with the binary sequence. As such, the binary sequence can be transmitted by the optical connector. To test a bit error rate of the optical connector, a pattern generator is employed and connected to the driving circuit. The pattern generator generates a pseudo-random binary sequence (PRBS), which is sent to the driving circuit and modulated by the light emitting from the light source of the driving circuit. Then, bit errors are detected to obtain the bit error rate. However, the pattern generator is typically costly, increasing a cost of the test. In addition, it is inconvenient to connect the pattern generator to the driving circuit.

Therefore, it is desirable to provide a driving circuit and an optical connector which can overcome the above-mentioned shortcomings.

DETAILED DESCRIPTION

Embodiments of the disclosure will be described in detail, with reference to the accompanying drawings.

Figure 1:
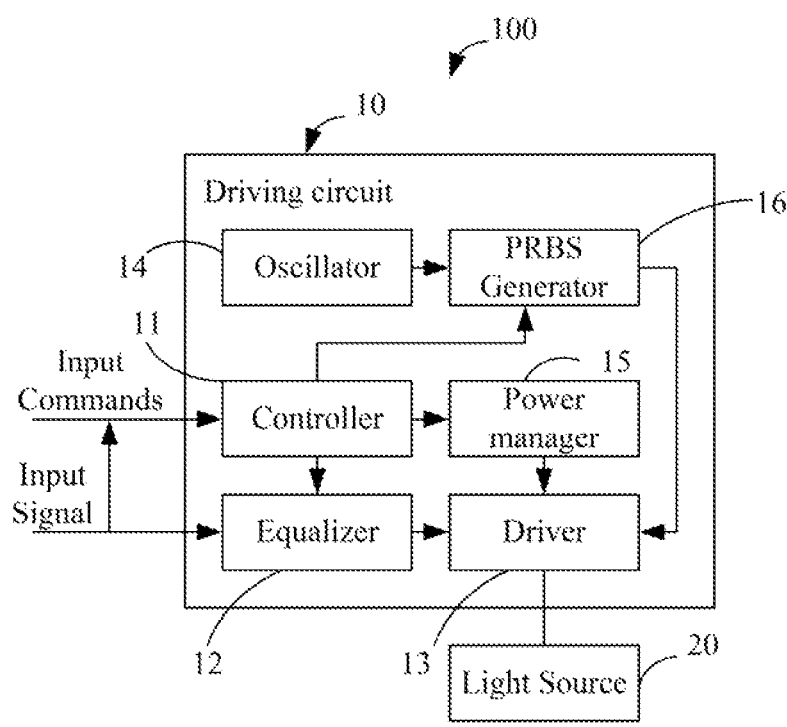
FIG. 1 is functional diagram of an optical connector, according to an embodiment.

Referring to FIG. 1, an optical connector 100, according to an embodiment, includes a driving circuit 10 and a light source 20.

The driving circuit 10 is configured for driving the light source 20 to emit light according to an input signal or a PRBS test signal. That is, the driving circuit 10 can modulate the light emitting from the light source 20 with the input signal for data transmission or with the PRBS test signal for a bit error rate test. The driving circuit 10 includes a controller 11, an equalizer 12, a driver 13, a power manager 15, a PRBS generator 16, and an oscillator 14.

The controller 11 receives input commands and controls the driving circuit 10 to be operated according to the input commands. The input commands control the equalizer 12, the power manager 15, and the PRBS generator 16 to perform in respective specific manners. The input commands may be contained in the input signal or input by users.

The equalizer 12 receives the input signal and filtering noise, if any, out of the input signal under the control of the controller 11. In this embodiment, the controller 11 activates the equalizer 12 and determines filtering parameters, according to the input commands. The equalizer 12, after being activated by the controller 11, is configured for receiving the filtering parameters and amplifying a specific frequency component while suppressing other frequency components of the input signal according to the filter parameters, thus filtering out the noise.

The driver 13 receives the input signal from the equalizer 11 and drives the light source 20 to emit light at a specific power output, according to the input signal. Thus, the input signal is carried on the light emitted by the light source 20.

The power manager 15 determines the specific power output under the control of the controller 10 and manages a power output of the driver 13 to the specific power output. In this embodiment, the controller 11 activates the power manager 15 and determines power control parameters according to input commands. The power manager 15, after being activated, receives the power control parameters and determining the specific power output.

The oscillator 14 generates a clock signal.

Figure 2:
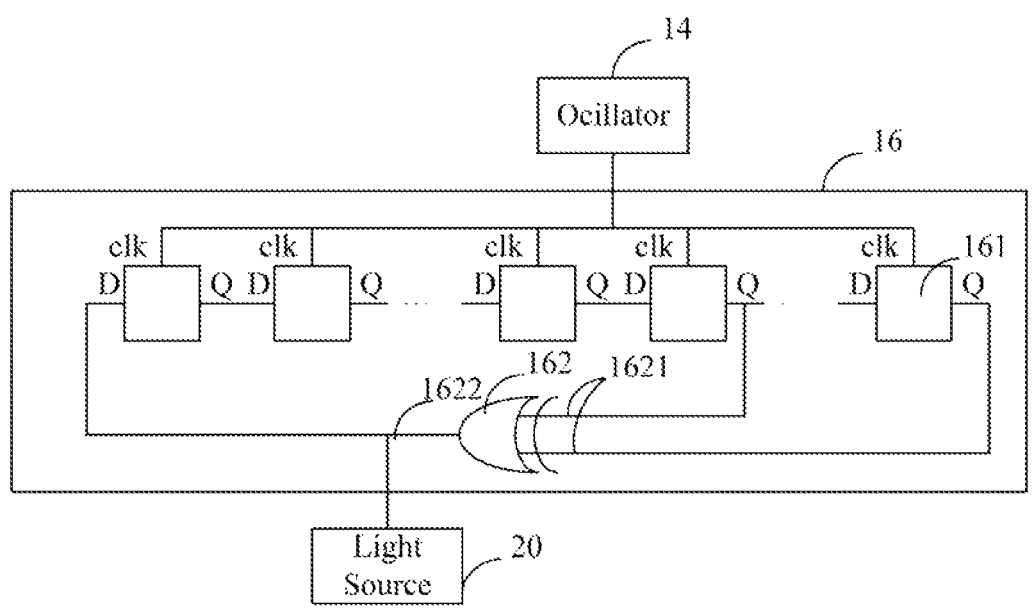
FIG. 2 is a circuit diagram of a PRBS generator of the optical connector of FIG. 1.

FIG. 2 illustrates the PRBS generator 16 generating the PRBS test signal. The PRBS generator 16 includes, for example, a number of D-type flip-flops 161 and an XOR gate 162.

Each of the flip-flop 161 includes a signal input D, a clock input CLK, and an output Q. The XOR gate 162 includes two inputs 1621 and an output 1622. The D-type flip-flops 161 are arranged in order. The signal inputs CLK of all the D-type flip-flops 161 are connected to the oscillator 114 for receiving the clock signal. The output Q of a former D-type flip-flop 161 is connected to the signal input D of a latter D-type flip-flop 161. The outputs Q of the m-th and n-th D-type flip-flops 161 are connected to the inputs 1621, respectively, wherein m, n are integers, m<n, and n is the number of the D-type flip-flops 161. The output 1622 is connected to the signal input D of the first D-type flip-flop 161 and the light source 20. The controller 11 is configured for activating the PRBD generator 16 according to the input commands.

The light source 20 can be a light emitting diode (LED) or a laser diode (LD).

In operation, the driving circuit 10 can be operated in two modes: normal working and test, determined by the input commands. If the input commands determine the driving circuit 10 to be operated in the normal working mode, the equalizer 12 and the power manager 13 are activated by the controller 11 while the PRBS generator 16 is deactivated, and then the input signal is modulated on light emitted from the light source 20 and thus is transmitted. On the other hand, if the input commands determine the driving circuit 10 to be operated in the test mode, the PRBS generator 16 and the power manager 13 are activated while the equalizer 12 is deactivated, and then the PRBS is generated and used for detecting a bit error rate of the optical connector 100.

As the PRBS generator 16 is generally constituted by low-cost elements and directed integrated into the driving circuit 10, the test of the bit error rate can be carried out with a low cost and more convenience.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A driving circuit, comprising:
   a controller;
   an equalizer;
   a power manager;
   a driver;
   a pseudo-random binary sequence (PRBS) generator; and an oscillator; wherein the controller is in communication with the equalizer, the PRBS generator, and the power manager, the controller is configured for receiving input commands and selectively activating the equalizer or the PRBS generator based upon the input commands, the controller is configured for determining filtering parameters when the equalizer is activated, the controller is configured for determining power parameters according to the input command and activating the power manager, the equalizer is configured for receiving an input signal and filtering noise out of the input signal according to the filtering parameters after being activated by the controller, the oscillator is configured for generating a clock signal, the PRBS generator is in communication with the oscillator and is configured for generating an PRBS test signal according to the clock signal after being activated by the controller, the power manager is configured for determining a specific power output according to the power parameters and managing a power output of the driver, and the driver is in communication with the equalizer and the PRBS generator and is configured for driving a light source of an optical connector to emit light at a specific power output, selectively according to the input signal or the PRBS test signal.

2. The driving circuit of claim 1, wherein the PRBS generator comprises a plurality of D-type flip-flops and an XOR gate, each of the flip-flops includes a signal input, a clock input, and an output, the XOR gate comprises two inputs and an output, the D-type flip-flops are arranged in order, the signal inputs of the D-type flip-flops are connected to the oscillator for receiving the clock signal, the output of a former D-type flip-flop is connected to the signal input of a latter D-type flip-flop, the outputs of the m-th and n-th D-type flip-flops are connected to the inputs of the XOR gate, respectively, wherein m, n are integers, m<n, and n is the number of the D-type flip-flops, the output of the XOR gate is connected to the signal input of the first D-type flip-flop.

3. An optical connector, comprising:
    a light source; and
    a driving circuit, comprising:
        a controller;
        an equalizer;
        a power manager;
        a driver;
        a pseudo-random binary sequence (PRBS) generator; and
        an oscillator; wherein the controller is in communication with the equalizer, the PRBS generator, and the power manager, the controller is configured for receiving input commands and selectively activating the equalizer or the PRBS generator based upon the input commands, the controller is configured for determining filtering parameters when the equalizer is activated, the controller is configured for determining power parameters according to the input command and activating the power manager, the equalizer is configured for receiving an input signal and filtering noise out of the input signal according to the filtering parameters after being activated by the controller, the oscillator is configured for generating a clock signal, the PRBS generator is in communication with the oscillator and is configured for generating an PRBS test signal according to the clock signal after being activated by the controller, the power manager is configured for determining a specific power output according to the power parameters and managing a power output of the driver, and the driver is in communication with the equalizer, the PRBS generator and the light source and is configured for driving the light source to emit light at a specific power output, selectively according to the input signal or the PRBS test signal.

4. The optical connector of claim 3, wherein the light source is selective from the group consisting of a light emitting diode and a laser diode.

5. The optical connector of claim 3, wherein the PRBS generator comprises a plurality of D-type flip-flops and an XOR gate, each of the flip-flops includes a signal input, a clock input, and an output, the XOR gate comprises two inputs and an output, the D-type flip-flops are arranged in order, the signal inputs of the D-type flip-flops are connected to the oscillator for receiving the clock signal, the output of a former D-type flip-flop is connected to the signal input of a latter D-type flip-flop, the outputs of the m-th and n-th D-type flip-flops are connected to the inputs of the XOR gate, respectively, wherein m, n are integers, m<n, and n is the number of the D-type flip-flops, the output of the XOR gate is connected to the signal input of the first D-type flip-flop and the light source.

\* \* \* \* \*